April 9, 1946.    W. D. KYLE    2,398,013
CABLE-GRIP
Filed July 12, 1943
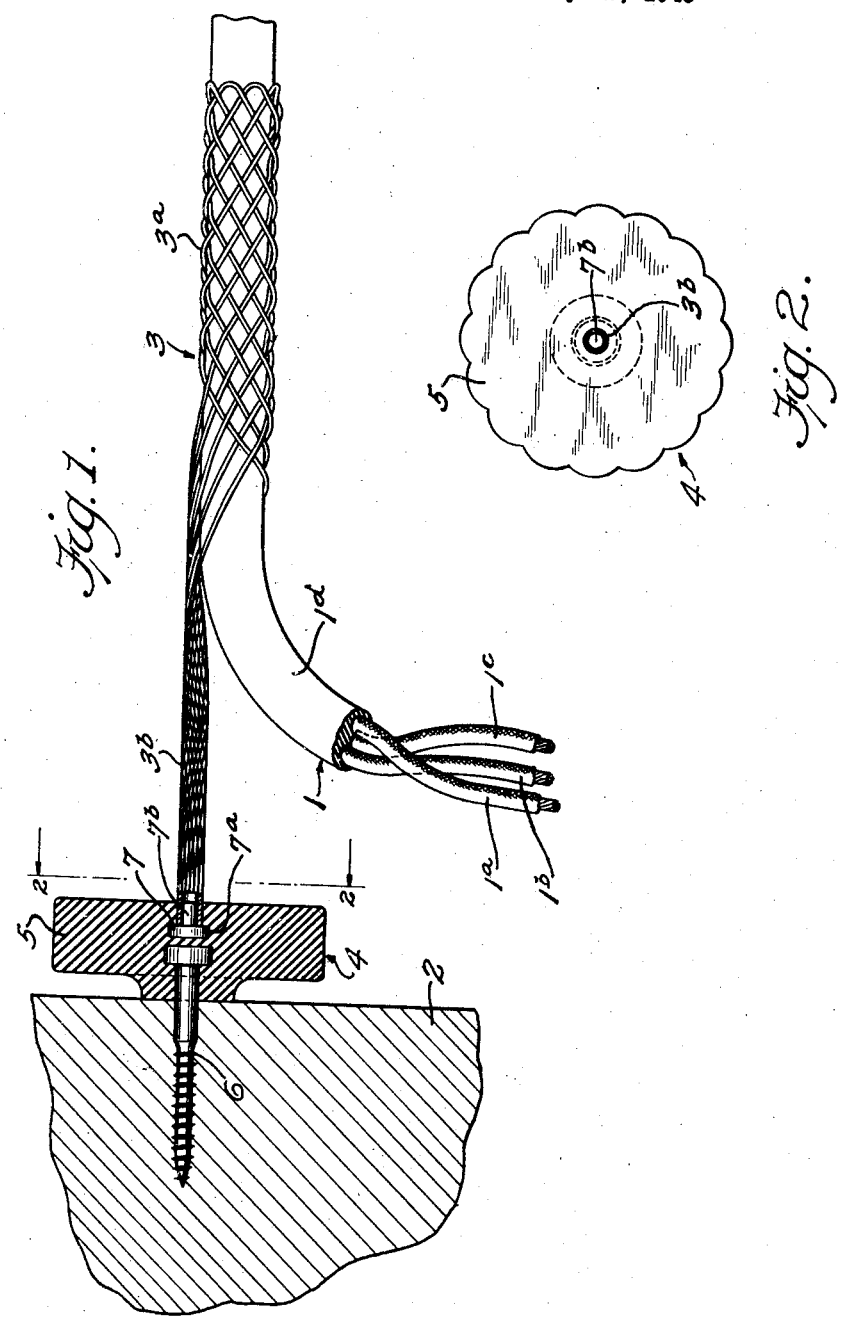
INVENTOR.
WILLIAM D. KYLE
BY Chester W Brown
ATTORNEY.

Patented Apr. 9, 1946

2,398,013

UNITED STATES PATENT OFFICE 2,398,013

CABLE GRIP

William D. Kyle, Milwaukee, Wis., assignor to Line Material Company, Milwaukee, Wis., a corporation of Delaware Application July 12, 1943, Serial No. 494,346

6 Claims. (Cl. 24—115)

This invention relates to a cable supporting grip.

The cable-grip hereinafter specifically described is of the type wherein a braided tubular sleeve embracing a cable contracts into gripping engagement with the cable in response to tension and expands to release the cable when the tension is removed.

Cable-grips of the type herein disclosed have heretofore been made of electrically conductive, corrosive material which are weakened by corrosion while in service, and frequently cut cable insulation with which they were engaged, causing short circuits to ground or, in the case of multiple cables, causing short circuits between the cable elements.

The primary object of this invention is threefold in nature; namely, to provide a cable-grip of the braided tubular type which will not be weakened by deterioration, will serve as a dielectric support, and will not cause short circuits in the event the insulation covering the cable is severed by the braids of the grip.

Specifically, the cable-grip hereinafter disclosed embodies individually non-conductive strands of material preferably braided to form a tube which is contractible under tension and expansible when the tension is removed, the grip thus formed serving as a dielectric support for a cable and insuring adequate insulation between the cable and ground and between the conductors of a multiple cable.

The novel results attained by this invention are realized by composing the braided tubular sleeve of strands of inert flexible material, such as spun glass, having adequate tensile strength and ability to withstand widely varying atmospheric temperatures.

Another feature of the invention hereinafter disclosed is the novel anchoring means with which the cable-grip may be equipped, whereby attachment of the grip to a supporting surface will be facilitated and will afford additional protective insulation between a cable and ground.

In the drawing which accompanies this specification:

Fig. 1 is an elevational view, partly in section, illustrating a preferred embodiment of the invention in the form of a dead-end support, which is shown attached to and supporting a cable or other conductor; and Fig. 2 is a sectional view taken along the line 2—2 of Fig. 1.

The supported member identified by reference numeral 1 is an electric cable embodying a plurality of individually insulated conductors 1a, 1b, and 1c enclosed in an outer insulating sheathing 1d. Although I have not shown a cable comprising a single insulated conductor, obviously such type can be supported by the cable grip hereafter described in exactly the same manner as illustrated in the drawing.

A pole 2, shown fragmentarily, in vertical section, provides a supporting structure to which the subject device is attached.

Embracing the horizontal portion of the cable is a tubular sleeve 3 composed of a plurality of helically laid and interlaced strands 3a, each of which extends end to end of the sleeve and back again, forming right and left hand helices about the axis of the sleeve. That is to say, one helf the length of each strand forms a right-hand helix and the remaining half-length a left-hand helix. The strands 3a are composed, preferably, of spun glass or similar non-metallic material having the requisite tensile strength and flexibility, while at the same time being substantially inert to corrosive atmospheric constituents and not detrimentally affectible by widely varying atmospheric temperatures.

The end of the sleeve which embraces the cable is braided on a mandrel of such diameter that the axis-wise opening therethrough normally is large enough to receive the cable freely, while the remainder of the sleeve may be braided on a much smaller mandrel, if indeed any mandrel is employed for that purpose.

The small end of the sleeve 3b is firmly attached to an anchoring means 4 which comprises a knob 5 preferably of molded "Bakelite" or the like, in which is firmly embedded the head end of a lag screw 6 which, as illustrated, is designed to be screwed into the supporting pole 2 or other supporting structure.

Knob 5 preferably is of substantial diameter and serrated peripherally, as shown in Fig. 2, so that a workman can obtain a good grip thereon and thus be enabled easily to force the lag screw into the pole without resort to a wrench or other tool.

Also embedded in knob 5 is a metal insert 7 having an enlarged head 7a and a shank 7b of smaller diameter proportioned to fit within the small end of sleeve 3 and form a core therein which serves to prevent collapse of the sleeve where it is embedded in the knob.

The molded "Bakelite" or like material of which the knob is composed is pressed into firm engagement with that portion of the sleeve which embraces shank 7b and into the interstices of the strands 3b surrounding said shank, and thus also into firm engagement with the shank itself, thereby creating a strong bond between the knob and sleeve—which bond will sustain all the load the sleeve is designed to bear.

The strands 3a of which the grip is composed are preferably of spun glass or similar material for the reason that they not only serve as means for gripping a cable supported thereby, but also perform their inherent function as insulation between the cable and ground and between the conductors of a multiple cable in the event the strands penetrate the cable insulation and contact the conductive material of the cable.

As previously noted, the cable supported by the grip may comprise a single insulated conductor rather than a plurality of conductors as illustrated. In any event, if the strands of the grip penetrate the insulation and contact a live conductor, the grip will not cause a short, but will serve as adequate insulation preventing a short.

Like all cable-grips of the same general character, the device of the present invention operates by contracting upon and gripping the cable in response to tension and can be released from the cable by relieving the tension.

The device herein described is characterized not only by its high resistance to corrosion, its ability to withstand widely varying temperature changes, and its inherent insulating quality, but also by simplicity and ease of installation and economy of manufacture.

While the provision of a knob of considerable diameter, proportioned to an average workman's hand and designed to enable the workman to secure a firm grip, is one of the features of my invention, it is not an indispensable feature. Similarly, it will be apparent that the described mode of bonding the braided sleeve to the knob is not dependent upon the use of spun glass or the like as the material out of which the sleeve is fabricated; nor is the utility of a knob such as described dependent upon the material comprising the sleeve or the mode of bonding the sleeve to the knob.

In using the term "spun glass," I refer to a product consisting of glass fibers of extreme fineness and resultant flexibility.

What is claimed is:

1. The combination in a cable-grip, of a braided tubular sleeve, said sleeve being contractible in response to tension applied thereto and effective to grippingly engage a cable, and anchoring means secured to one end of said sleeve, said anchoring means comprising a molded member of dielectric material, an insert embedded in said molded member and having a shank portion projecting into and forming a core filling one end of said sleeve, said core-filled end being also embedded in said molded member, and means carried by said molded member for effecting attachment thereof to a supporting structure.

2. The combination in a cable grip of a plurality of braided strands of non-conductive dielectric material affording insulation for a cable supported thereby and preventing short circuiting thereof, and anchoring means secured to one end of said braided strands, said anchoring means comprising a molded member of dielectric material, an insert embedded in said molded member and having a shank portion projecting into and forming a core filling one end of said braided strands, said core filled end being also embedded in said molded member for effecting attachment thereof to a supporting structure.

3. The combination in a cable-grip, of a braided tubular sleeve, said sleeve being contractible in response to tension applied thereto and effective to grippingly engage a cable, and anchoring means secured to one end of said sleeve, said anchoring means comprising a molded Bakelite knob, an insert embedded in said knob and having a shank portion projecting into and forming a core filling one end of said sleeve, said core filled end being also embedded in said knob, and means carried by said knob for effecting attachment thereof to a supporting structure.

4. A cable-grip comprising a plurality of braided strands of non-conductive dielectric material formed in part to include a contractible sleeve for gripping engagement with a cable and in part an elongated anchoring portion, in combination with anchoring means comprising a molded member of dielectric material embedding one end of said anchoring portion in bonded relationship therewith, and means carried by said molded member for effecting attachment thereof to a supporting structure.

5. A cable-grip comprising a plurality of braided strands of non-conductive dielectric material formed in part to include a contractible sleeve portion for gripping engagement with a cable and in part an elongated anchoring sleeve portion of lesser cross-sectional diameter than the first mentioned portion, in combination with anchoring means secured to one end of said anchoring sleeve portion and comprising a molded member of dielectric material embedding and bonded to said anchoring sleeve portion, and a screw projecting from said molded member and having a head and embedded in said molded member.

6. A cable-grip comprising a plurality of braided strands of non-conductive dielectric material formed in part to include a contractible sleeve portion for gripping engagement with a cable and in part an elongated anchoring sleeve portion of lesser cross-sectional diameter than the first mentioned portion, in combination with anchoring means comprising a dielectric body embedding the end of said anchoring sleeve portion remote from said first mentioned portion, and means carried by said body for effecting attachment thereof to a supporting structure.

WILLIAM D. KYLE.